United States Patent Office 3,539,333
Patented Nov. 10, 1970

3,539,333
COMBATING WEEDS IN SUGAR BEETS
Kenneth P. Dubrovin, Leawood, Kans., assignor to Gulf Research & Development Company, Pittsburgh, Pa., a corporation of Delaware
No Drawing. Filed Aug. 21, 1968, Ser. No. 754,477
Int. Cl. A01n 9/20, 9/22, 9/24
U.S. Cl. 71—111    3 Claims

ABSTRACT OF THE DISCLOSURE

A greater variety of troublesome species of weeds in sugar beet fields is controlled by post-emergent application of a synergistic combination of benzamidooxyacetic acid with a compound selected from 3-cyclohexyl-6,7-dihydro-1H-cyclopentapyrimidine-2,4-(3H,5H)-dione and 3'-carbomethoxyaminophenyl 3-methyl-carbanilate.

DESCRIPTION OF THE INVENTION

Benzamidooxyacetic acid has recently been discovered to possess specific utility for controlling weeds such as kochia species in irrigated sugar beet fields. This herbicide, which is an acid, is conveniently formulated in aqueous solution with the aid of a water soluble base, so as to convert the acid to a salt and improve water solubility. It has been observed that these benzamidooxyacetate salt formulations are apparently compatible with other similar formulations, so that it is feasible to mix two herbicides and apply them in a single spraying. However, it has also been observed that mixtures of benzamidooxyacetic acid with other herbicides are subject to the usual disadvantages of herbicide mixtures. That is, the selectivity patterns of the two compounds are not the same, and when added together, become less selective, resulting in increased injury to crops. This is true because selectivity is a relative, rather than an absolute characteristic. Adequate selectivity is obtained by keeping herbicide application rates within empirically determined limits. Some injury to crops usually occurs, but when the herbicide is applied intelligently the injury is insignificant. Unfortunately, when two herbicides which individually cause insignificant injury are mixed together, they usually produce substantial injury, which reduces the utility of the combination.

I have discovered, however, that in certain specific instances the effect of benzamidooxyacetic acid on other herbicides is not additive. Fortuitously, much greater than additive herbicidal effects are obtained on certain weeds, with only slightly more than additive effects on sugar beets. By proper adjustment of application rates, therefore, greatly accentuated selectivity can be obtained in combating some particularly noxious weeds. Use of the improved method of weed control is explained and illustrated by means of specific examples in the discussion which follows.

Benzamidooxyacetic acid may be readily prepared by published methods, as, for example, the procedure disclosed in J. Chem. Soc. p. 227 (1960), or may be purchased as a fine chemical or a herbicide. The other herbicides of the group are well-known compounds, available commercially as herbicides. "Lenacil" is the common name of 3-cyclohexyl-6,7-dihydro-1H-cyclopentapyrimidine-2,4-(3H,5H)-dione, under which this compound is available commercially. "Phenmedipham" is the common name under which 3'-carbomethoxyaminophenyl 3-methylcarbanilate is sold in some areas. A method of synthesis of this and other similar compounds is disclosed in Netherlands patent application 6713925, published on Apr. 16, 1968. Briefly, the method consists of phosgenation of a mixture of m-toluidine and methyl 3-hydroxycarbanilate in solution in a solvent such as dioxan. The hydroxycarbanilate is made by conventional methods from m-aminophenol.

Benzamidooxyacetic acid may be formulated in aqueous spray mixtures either as the acid, or in combination with non-phytotoxic basic substances to improve water-solubility and increase the pH of the mixture. However, the other herbicides employed in the synergistic combinations of this invention are less stable in storage under aqueous alkaline conditions. For this reason it is preferable to prepare the synergistic combination as an emulsifiable concentrate, either as a dry powder or a non-aqueous liquid emulsifiable concentrate, in which the essential ingredients are herbicidal compounds, dispersing agent and non-aqueous diluent. Suitable procedures for preparation of concentrates are illustrated below.

PREPARATION OF WETTABLE POWDER

A wettable powder is conveniently prepared by combining in a blender dry active ingredients plus about 20 to 75 percent by weight of a fluffing diluent, such as diatomaceous earth or finely divided alumina of low bulk density and a minor proportion of one or more suitable surface active agents to increase speed of wetting and promote formation of a stable dispersion in water. The mixture, after dry blending, is passed through a hammer mill or other dry grinding device until the diameter of all the solid particles is substantially below 50 microns. Some segregation may occur as a result of differences in the grinding rates of the various components. By reblending after grinding, a homogeneous product is obtained.

Wettable powders, particularly when packaged in sealed containers have excellent storage life and may be shipped more economically than other formulations.

PREPARATION OF DISPERSIBLE CONCENTRATE SOLUTION

Dispersible solutions of the combination of herbicides are readily prepared in organic solvents such as isophorone, cyclohexanone, xylene, glycol and mixtures thereof. About 15 to 20 percent herbicide is usually dissolved in a mixture of solvents, along with at least one surface active agent to aid in dispersion of the solution in water. Dispersible concentrates of this type are preferably prepared at low enough concentrations so as to avoid precipitation at low storage temperatures.

PREPARATION OF OIL-BASED WATER-DISPERSIBLE CONCENTRATE

An oil-based water-dispersible concentrate is conveniently prepared by trituration of preferably in a sand mill. The herbicides are mixed with a low-viscosity non-phytotoxic agricultural spray oil in the proportion of about 25 percent solids by weight. The resulting suspension is poured into a sand mill and milling is begun. The optimum solid to liquid ratio for efficient milling is determined by observation, while adding oil to the mill, and if necessary adding more solids to adjust the solids content back to optimum after adding oil past the optimum ratio, which is usually in the vicinity of 15 to 20 percent solids. After milling to obtain a dispersion of small, uniform particle size, an emulsifier is added. In a specific instance, the condensation product of nonylphenol with about 6 mols of ethylene oxide is added in the proportion of about 50 percent by weight of the herbicide. During or after thorough mixing, sufficient oil is added to the mixture to lower the total solids content to about 10 to 15 percent by weight. The resulting mixture is readily dispersed in water to provide spray mixtures of the desired volume and concentrations for use in the field.

CONTROL OF WEEDS

So as to illustrate the operation of the weed control method and demonstrate synergistic effects, the following examples of both greenhouse and field tests are presented. In each example, spray mixtures were made up to appropriate concentrations by mixing dispersible concentrate with water, so that the herbicides could be applied at the desired rate within a total spray volume of about 40 gallons per acre.

In the greenhouse tests, plants which were grown in four-inch clay pots under identical conditions for about two to three weeks were sprayed, and observations were taken after two weeks had elapsed. Ratings were made according to the following schedule:

| Condition: | Degree |
|---|---|
| No effect | 0 |
| Slight effect | 1 |
| Moderate effect | 2 |
| Severe effect | 3 |
| Complete control (all plants died) | 4 |

The following species of plants were sprayed in the greenhouse tests: Sugar beets, kochia, green foxtail, lambsquarters, and pigweed.

In field tests, particularly severe infestations of the following weeds were sprayed in sugar beet fields: buffalo bur, barnyard grass and lambsquarters.

EXAMPLE 1

In greenhouse tests, potted plants were sprayed at the rate of ½ lb. per acre of benzamidooxyacetic acid and ½ lb. per acre of 3'-carbomethoxyaminophenyl 3-methylcarbanilate in an aqueous spray mixture, applied at a spray volume of about 40 gallons per acre. Complete control was obtained on kochia, green foxtail, lambsquarters and pigweed. All effects on these weeds were greater than additive, the synergistic effect being the greatest on pigweed. Injury to sugar beets was rated as 1, which is also greater than additive, but is an injury from which sugar beets recover, particularly in the absence of competition from pigweed and kochia. At the ½ lb. per acre level, neither herbicide alone was found to either injure the sugar beets or give complete control of any of the weeds. Injury to pigweed at this application level was only slight. At the 1 lb. per acre level of application, neither herbicide alone gave complete control of any of the weeds, with the exception of lambsquarters. This combination of herbicides is particularly useful for controlling weeds in irrigated sugar beet fields where pigweed and kochia species present severe problems.

EXAMPLE 2

In field tests in western Kansas and eastern Colorado, a spray mixture of benzamidooxyacetic acid and 3-cyclohexyl-6,7-dihydro-1H-cyclopentapyrimidine - 2,4 - (3H, 5H)-dione was applied to weed-infested areas of beet fields, each herbicide being applied at the rate of 2 lbs. per acre. Control of barnyard grass was better than 90 percent and of both buffalo bur and lambsquarters was better than 60 percent. Injury to sugar beets was only slight. All of the herbicide effects were greater than additive.

In the field, weed plants are in all sizes and grow so thick that some plants protect others from the herbicide spray. Consequently, between the time of spraying and the time of observation some of the young weeds grow up from their sheltered positions and so lower weed control ratings are obtained than in greenhouse tests. However, most of the surviving younger weeds are at about the same stage of growth and on prompt second treatment of a field, much better weed control ratings are obtained.

This combination of herbicides is particularly useful in combating buffalo bur and noxious grasses in sugar beet fields.

I claim:

1. The method of combating weeds in sugar beet fields consisting of applying post-emergently to the weeds a herbicidally effective amount, at least 1 lb. per acre of a composition consisting of benzamidooxyacetic acid in combination with a compound selected from the group consisting of: 3-cyclohexyl - 6,7 - dihydro-1H-cyclopentapyrimidine-2,4-(3H,5H)-dione and 3'-carbomethoxyaminophenyl 3-methylcarbanilate, sufficient to product a greater than additive selective herbicide effect.

2. The method according to claim 1 in which the herbicidal compounds are applied in the form of an aqueous dispersion in combination with a non-phytotoxic hydrocarbon oil and a non-phytotoxic dispersing agent.

3. The method of combating weeds in sugar beet fields consisting of applying post-emergently to the weeds a herbicidally effective amount, at least 1 lb. per acre of a composition consisting of benzamidooxyacetic acid in combination with sufficient 3'-carbomethoxyaminophenyl 3-methylcarbanilate to produce a greater than additive selective herbicide effect.

References Cited

UNITED STATES PATENTS

| 3,235,360 | 2/1966 | Soboczenski | 71—92 |
| 3,396,009 | 8/1968 | Neighbors | 71—115 |
| 3,404,975 | 10/1968 | Wilson et al. | 71—111 |

LEWIS GOTTS, Primary Examiner

G. HOLLRAH, Assistant Examiner

U.S. Cl. X.R.

71—92, 115